US011973265B2

(12) United States Patent
Ryu et al.

(10) Patent No.: US 11,973,265 B2
(45) Date of Patent: Apr. 30, 2024

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Han Sub Ryu, Gyeongsangbuk-do (KR); Dong Pil Park, Incheon (KR); Yun Seok Oh, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 291 days.

(21) Appl. No.: 17/492,807

(22) Filed: Oct. 4, 2021

(65) Prior Publication Data

US 2022/0029278 A1 Jan. 27, 2022

Related U.S. Application Data

(63) Continuation of application No. PCT/KR2020/004400, filed on Mar. 31, 2020.

(30) Foreign Application Priority Data

Apr. 2, 2019 (KR) ........................ 10-2019-0038332

(51) Int. Cl.

| | |
|---|---|
| ***H01Q 1/24*** | (2006.01) |
| ***H01Q 1/36*** | (2006.01) |
| ***H01Q 1/48*** | (2006.01) |

(52) U.S. Cl.

CPC ................. *H01Q 1/36* (2013.01); *H01Q 1/48* (2013.01); *H01Q 1/243* (2013.01)

(58) Field of Classification Search

CPC ............ H01Q 1/36; H01Q 1/48; H01Q 1/243; H01Q 1/38; H01Q 1/24; H01Q 1/50; H01Q 1/22; H01Q 9/0407; G09F 9/00

See application file for complete search history.

(56) References Cited

U.S. PATENT DOCUMENTS

| | | | |
|---|---|---|---|
| 6,452,549 | B1 | 9/2002 | Lo |
| 2019/0042811 | A1 | 2/2019 | Yamagishi et al. |

(Continued)

FOREIGN PATENT DOCUMENTS

| | | | |
|---|---|---|---|
| CN | 101520708 | A | 9/2009 |
| CN | 105576344 | A | 5/2016 |

(Continued)

OTHER PUBLICATIONS

Office action issued on Feb. 24, 2023 from Korean Patent Office in a counterpart Korean Patent Application No. 10-2019-0038332 (all the cited references are listed in this IDS.) (English translation is also submitted herewith.).

(Continued)

*Primary Examiner* — Awat M Salih

(74) *Attorney, Agent, or Firm* — The PL Law Group, PLLC

(57) ABSTRACT

An antenna device according to an embodiment of the present disclosure includes a dielectric layer, a first electrode layer disposed on an upper surface of the dielectric layer, the first electrode layer including a radiator and having a first mesh structure, and a second electrode layer disposed on a lower surface of the dielectric layer, the second electrode layer having a second mesh structure. The first mesh structure and the second mesh structure are aligned to be offset or staggered from each other with respect to the dielectric layer in a planar view.

15 Claims, 5 Drawing Sheets

(56) References Cited

U.S. PATENT DOCUMENTS

| | | | | |
|---|---|---|---|---|
| 2020/0251813 | A1* | 8/2020 | Ryu | H01Q 1/38 |
| 2022/0368008 | A1* | 11/2022 | Huh | G06F 1/1698 |

FOREIGN PATENT DOCUMENTS

| | | | |
|---|---|---|---|
| CN | 107705883 | A | 2/2018 |
| CN | 108536329 | A | 9/2018 |
| CN | 207924639 | U | 9/2018 |
| CN | 212062669 | U | 12/2020 |
| KR | 10-2007-0089588 | A | 8/2007 |
| KR | 10-2010-0104739 | A | 9/2010 |
| KR | 10-2013-0095451 | A | 8/2013 |
| KR | 10-2016-0050467 | A | 5/2016 |
| KR | 10-1940797 | B1 | 1/2019 |
| KR | 101940797 | * | 1/2019 |
| KR | 10-2019-0021838 | A | 3/2019 |
| WO | WO 2018/118321 | A1 | 6/2018 |
| WO | WO 2018/179893 | A1 | 10/2018 |
| WO | WO 2019/039877 | A1 | 2/2019 |
| WO | WO 2019/044120 | A1 | 3/2019 |

OTHER PUBLICATIONS

International Search Report for PCT/KR2020/004400 mailed on Jul. 3, 2020.

* cited by examiner

110

ANTENNA DEVICE AND DISPLAY DEVICE INCLUDING THE SAME

CROSS REFERENCE TO RELATED APPLICATIONS AND CLAIM OF PRIORITY

The present application is a continuation application to International Application No. PCT/KR2020/004400 with an International Filing Date of Mar. 31, 2020, which claims the benefit of Korean Patent Applications No. 10-2019-0038332 filed on Apr. 2, 2019 at the Korean Intellectual Property Office, the disclosures of which are incorporated by reference herein in their entirety.

BACKGROUND

1. Field

The present invention relates to an antenna device and a display device including the same. More particularly, the present invention related to an antenna device including electrode patterns and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high-frequency or ultra-high frequency communication is needed in the display device. Further, as thin-layered display devices with high transparency and resolution such as a transparent display device, a flexible display device, etc., have been developed recently, the antenna having improved transparent and flexible properties is also required.

A size of a screen in the display device becomes greater, a space or an area of a bezel portion or a light-shielding portion becomes smaller. In this case, a space or an area for an antenna may be also limited, and thus a radiator included in the antenna for a signal transfer/reception may overlap a display region of the display device.

Accordingly, an image of the display device may be covered by the radiator of the antenna, and the radiator may be visually recognized by a user, thereby degrading an image quality.

Additionally, when the electrodes included in the antenna include a plurality of electrode lines, electrode recognition may be caused to the user due to an overlap or a misalignment of the electrode lines.

For example, Korean Patent Application Publication No. 2013-0095451 discloses an antenna integrated in a display, but fails to consider an image degradation by the antenna in a display device.

SUMMARY

According to an aspect of the present invention, there is provided an antenna device having improved visual property and signaling efficiency.

According to an aspect of the present invention, there is provided a display device including an antenna device having improved visual property and signaling efficiency.

The above aspects of the present invention will be achieved by one or more of the following features or constructions:

(1) An antenna device, comprising: a dielectric layer; a first electrode layer disposed on an upper surface of the dielectric layer, the first electrode layer including a radiator and having a first mesh structure; and a second electrode layer disposed on a lower surface of the dielectric layer, the second electrode layer having a second mesh structure, wherein the first mesh structure and the second mesh structure are aligned to be offset or staggered from each other with respect to the dielectric layer in a planar view.

(2) The antenna device according to the above (1), wherein the first mesh structure includes first electrode lines which cross each other to define first unit cells, and the second mesh structure includes second electrode lines which cross each other to define second unit cells.

(3) The antenna device according to the above (2), wherein the first unit cells and the second unit cells are projected in the planar view to be offset or staggered from each other such that sub-cells each of which is smaller than each of the first and second unit cells are defined.

(4) The antenna device according to the above (3), wherein the first unit cells and the second unit cells are each uniformly divided into a plurality of the sub-cells.

(5) The antenna device according to the above (3), wherein each of the first unit cells, the second unit cells and the sub-cells has a rhombus shape.

(6) The antenna device according to the above (5), wherein the first unit cells and the second unit cells are each divided into 4 sub-cells.

(7) The antenna device according to the above (1), wherein the second electrode layer serves as a ground electrode of the radiator.

(8) The antenna device according to the above (7), wherein the first electrode layer further includes a dummy electrode around the radiator, and the dummy electrode is separated from the radiator.

(9) The antenna device according to the above (8), wherein the dummy electrode includes the first mesh structure.

(10) The antenna device according to the above (9), wherein the radiator and the dummy electrode are entirely superimposed over the second electrode layer in a thickness direction.

(11) The antenna device according to the above (1), wherein the second electrode layer includes a lower radiator and a lower dummy electrode formed from the second mesh structure.

(12) The antenna device according to the above (1), further comprising: a transmission line electrically connected to the radiator on the upper surface of the dielectric layer; and a signal pad connected to an end of the transmission line.

(13) The antenna device according to the above (12), wherein the signal pad has a solid structure.

(14) The antenna device according to the above (12), further comprising a ground pad on the upper surface of the dielectric layer, wherein the ground pad is disposed around the signal pad to be separated from the signal pad.

(15) The antenna device according to the above (1), wherein the first electrode layer and the second electrode layer include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca) or an alloy thereof.

(16) A display device comprising the antenna device according to any one of the above (1) to (15).

An antenna device according to exemplary embodiments of the present invention may include a radiator and a ground electrode which may include a mesh structure having a plurality of unit cells. The radiator and the ground electrode may be aligned such that the unit cell may be uniformly divided into sub-unit cells in a planar view.

Thus, a reduction of transmittance and an increase of an electrode recognition due to an overlap of electrode lines and an increase of an electrode area caused by an misalignment of the ration electrode and the ground electrode may be prevented.

The antenna device may be inserted or mounted on a front portion of the display device to improve signaling sensitivity and transmittance and to minimize degradation of an image quality of the display device. Further, the antenna device may include a mesh structure formed of a metallic material to have improved flexibility, and thus may be effectively applied to a flexible display device.

DETAILED DESCRIPTION OF THE EMBODIMENTS

According to exemplary embodiments of the present invention, there is provided an antenna device including a radiator and a ground electrode. The antenna device may have improved transmittance and signaling sensitivity while an electrode recognition may be prevented.

The antenna device may be applied to a device for high frequency band or ultra-high frequency band (e.g., 3G, 4G, 5G or more) mobile communications.

According to exemplary embodiments of the present invention, there is provided a display device including the antenna device. An application of the antenna device is not limited to the display device, and the antenna device may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
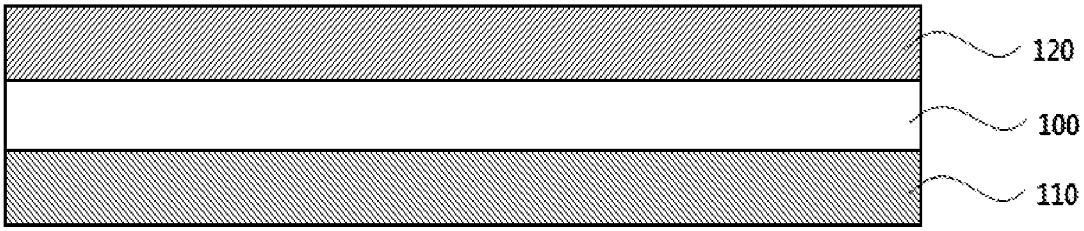
FIGS. 1 and 2 are schematic cross-sectional and top planar views, respectively, illustrating an antenna device in accordance with exemplary embodiments.
Figure 2:
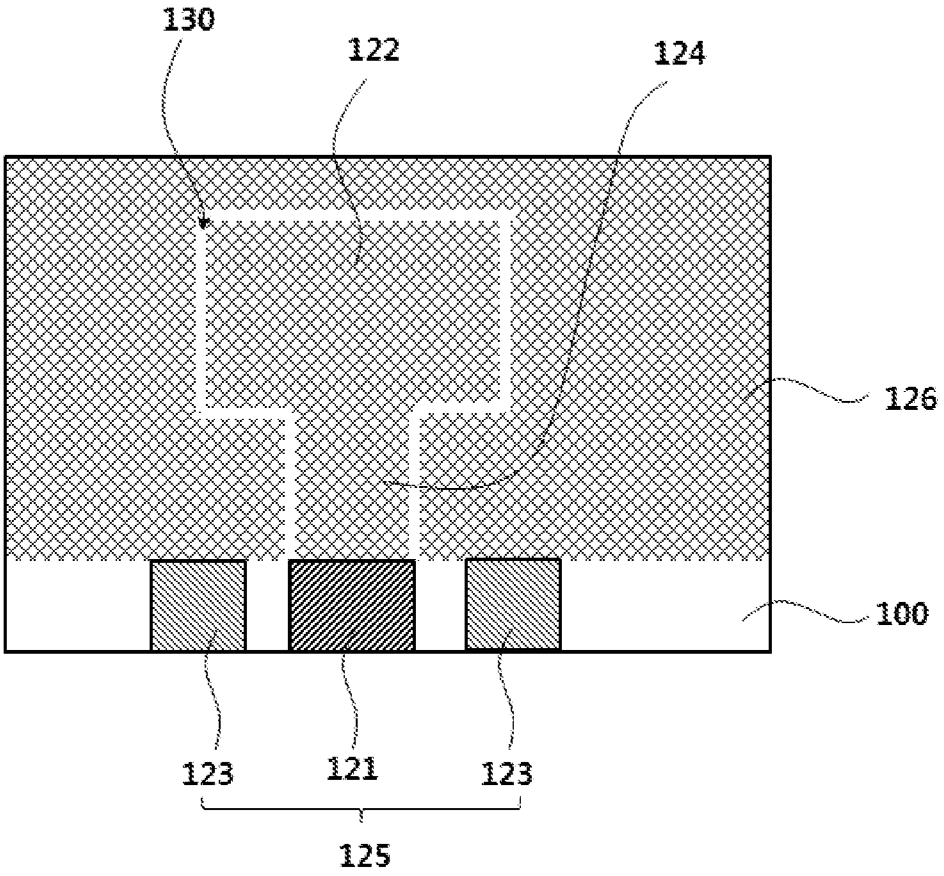

FIGS. 1 and 2 are schematic cross-sectional and top planar views, respectively, illustrating an antenna device in accordance with exemplary embodiments.

Referring to FIGS. 1 and 2, an antenna device according to exemplary embodiments may include a dielectric layer 100, a first electrode layer 120 disposed on an upper surface of the dielectric layer 100, and a second electrode layer 110 disposed on a lower surface of the dielectric layer 100

The dielectric layer 100 may include an insulation material having a predetermined dielectric constant. The dielectric layer 100 may include, e.g., an inorganic insulation material such as glass, silicon oxide, silicon nitride, metal oxide, etc., or an organic insulation material such as an epoxy resin, an acrylic resin, an imide-based resin, etc. The dielectric layer 100 may serve as a film substrate of the antenna device on which the first electrode layer 110 may be formed.

For example, a transparent film may be used as the dielectric layer 100. The transparent film may include, e.g., a polyester-based resin such as polyethylene terephthalate, polyethylene isophthalate, polyethylene naphthalate, polybutylene terephthalate, etc.; a cellulose-based resin such as diacetyl cellulose, triacetyl cellulose, etc.; a polycarbonate-based resin; an acrylic resin such as polymethyl (meth) acrylate, polyethyl (meth)acrylate, etc.; a styrene-based resin such as polystyrene, an acrylonitrile-styrene copolymer, etc.; a polyolefin-based resin such as polyethylene, polypropylene, a cyclo-based or norbornene-structured polyolefin, an ethylene-propylene copolymer, etc.; a vinyl chloride-based resin; an amide-based resin such as nylon, an aromatic polyamide, etc.; an imide-based resin; a polyether sulfone-based resin; a sulfone-based resin; a polyether ether ketone-based resin; a polyphenylene sulfide-based resin; a vinyl alcohol-based resin; a vinylidene chloride-based resin; a vinyl butyral-based resin; an allylate-based resin; a polyoxymethylene-based resin; an epoxy-based resin; a urethane or acryl urethane-based resin; a silicone-based resin, etc. These may be used alone or a combination thereof.

In some embodiments, an adhesive film including, e.g., as an optically clear adhesive (OCA), an optically clear resin (OCR), or the like may be included in the dielectric layer 100.

In some embodiments, the dielectric layer 100 may include an inorganic insulating material such as glass, silicon oxide, silicon nitride, silicon oxynitride, or the like.

In some embodiments, a dielectric constant of the dielectric layer 100 may be adjusted in a range from about 1.5 to about 12. If the dielectric constant exceeds about 12, a driving frequency may be excessively reduced and an antenna driving in a desired high frequency band may not be obtained.

As illustrated in FIG. 2, the first electrode layer 120 may include an antenna pattern including a radiator 122 and a transmission line 124. The antenna pattern or the first electrode layer 120 may further include a pad electrode 125 connected to an end of the transmission line 124.

In some embodiments, the first electrode layer 120 may further include a dummy electrode 126 arranged around the antenna pattern.

The first electrode layer 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca) or an alloy thereof. These may be used alone or in combination thereof.

In an embodiment, the first electrode layer 120 may include silver or a silver alloy to have a low resistance. For example, first electrode layer 120 may include a silver-palladium-copper (APC) alloy.

In an embodiment, first electrode layer 120 may include copper (Cu) or a copper alloy in consideration of low resistance and pattern formation with a fine line width. For example, first electrode layer 120 may include a copper-calcium (Cu—Ca) alloy.

In some embodiments, the first electrode layer 120 may include a transparent metal oxide such as indium tin oxide (ITO), indium zinc oxide (IZO), indium zinc oxide (ITZO), zinc oxide (ZnOx), etc.

For example, the first electrode layer 120 may have a multi-layered structure including a metal or alloy layer and a transparent metal oxide layer.

In some embodiments, the first electrode layer 120 may include a lamination structure of a transparent conductive oxide layer and metal layer, for example, may have a two-layer structure of transparent conductive oxide layer-metal layer or a three-layer structure of transparent conductive oxide layer-metal layer-transparent conductive oxide layer. In this case, resistance may be reduced to improve signal transmission speed while improving flexible properties by the metal layer, and corrosion resistance and transparency may be improved by the transparent conductive oxide layer.

In exemplary embodiments, the radiator 122 of the antenna pattern or the first electrode layer 120 may include a mesh structure (a first mesh structure). Accordingly, transmittance of the radiator 122 may be increased, and flexibility of the antenna device may be enhanced. Thus, the antenna device may be effectively applied to a flexible display device.

In some embodiments, the dummy electrode 126 may also include a mesh structure, and a mesh structure having a shape substantially the same as that included in the radiator 122 (the first mesh structure) may be included in the dummy electrode 126. In some embodiments, the dummy electrode 126 and the radiator 122 may include the same metal.

The transmission line 124 may extend from one end of the radiator 122 and may be electrically connected to the pad electrode 125. For example, the transmission line 124 may protrude from a central portion of the radiator 122.

In an embodiment, the transmission line 124 may include a conductive material that may be substantially the same as that of the radiator 122 and may be formed by substantially the same etching process. In this case, the transmission line 124 may be integrally connected with the radiator 122 and may be provided as a substantially single or unitary member.

In some embodiments, the transmission line 124 and the radiating electrode 122 may include substantially the same mesh structure.

The pad electrode 125 may include a signal pad 121 and a ground pad 123. The signal pad 121 may be electrically connected to the radiator 122 via the transmission line 124, and may electrically connect a driving circuit unit (e.g., an IC chip) and the radiator 122 with each other.

For example, a circuit board such as a flexible circuit board (FPCB) may be bonded on the signal pad 121, and the driving circuit unit may be disposed on the flexible circuit board. Accordingly, signal transmission/reception may be implemented between the antenna pattern and the driving circuit unit. For example, the driving circuit unit may be directly mounted on the flexible circuit board.

In some embodiments, a pair of the ground pads 123 may face each other with respect to the signal pad 121 while being electrically and physically separated from the signal pad 121. Accordingly, a horizontal radiation may be also implemented together with a vertical radiation by the antenna device.

The pad electrode 125 may have a solid structure including the metal or alloy as described above to reduce signal resistance.

As described above, the dummy electrode 126 may include the mesh structure substantially the same as that of the radiator 122, and may be electrically or physically separated or spaced from the antenna pattern and the pad electrode 125.

For example, a separation region 130 may be formed along a side line or a profile of the antenna pattern to separate the dummy electrode 126 and the antenna pattern from each other.

As described above, the antenna pattern may be formed to include the mesh structure so that the transmittance of the antenna device may be improved. In an embodiment, electrode lines included in the mesh structure may be formed of a low resistance metal such as copper, silver, an APC alloy or a CuCa alloy to suppress a resistance increase. Therefore, a transparent film antenna having low resistance and high sensitivity may be provided.

Further, the dummy electrode 126 having the same mesh structure may be arranged around the antenna pattern so that the antenna pattern may be prevented from being seen by the user of the display device due to a local deviation of electrode arrangements.

The second electrode layer 110 may serve as a ground electrode of the antenna pattern. For example, capacitance or inductance may be formed between the radiator 122 and the second electrode layer 110 by the dielectric layer 100 in a thickness direction of the antenna device, so that a driving or sensing frequency band of the antenna device may be adjusted. For example, the antenna device may be provided as a vertical radiation antenna by the second electrode layer 110.

In exemplary embodiments, the second electrode layer 110 may include the above-mentioned metal or alloy, and may include a mesh structure (a second mesh structure) having the same shape (e.g., the same line width and the same spacing distance) as that in the antenna pattern or the radiator 122. Additionally, the second electrode layer 110, the radiator 122 and the dummy electrode 126 may include a mesh structure having the same shape.

The first electrode layer 120 and the second electrode layer 110 which are projected or overlapped with each other in the thickness direction may be formed to have the same mesh structure, so that a visual recognition of electrodes due to an overlap of different conductive pattern shapes may be prevented while improving transmittance of the antenna device.

For convenience of descriptions, only one antenna pattern is illustrated in FIG. 2, but a plurality of the antenna patterns may be arranged in an array form on the dielectric layer 100. In this case, the second electrode layer 110 may have a sufficient area to entirely cover the array of the antenna patterns in a planar view.

In some embodiments, the second electrode layer 110 may also include a radiator (e.g., a lower radiator) and a dummy electrode (e.g., a lower dummy electrode) as illustrated in FIG. 2. The radiator and the dummy electrode of the second electrode layer 110 may be formed from the second mesh structure.

In this case, the antenna device may be provided as a double-sided radiation antenna by which an antenna radiation is performed from each of the upper and lower surfaces of the dielectric layer 100. In an embodiment, the lower dummy electrode of the second electrode layer 110 may overlap the radiator 122 of the first electrode layer 120 in the thickness direction and may serve as a ground electrode of the radiator 122.

Figure 3:
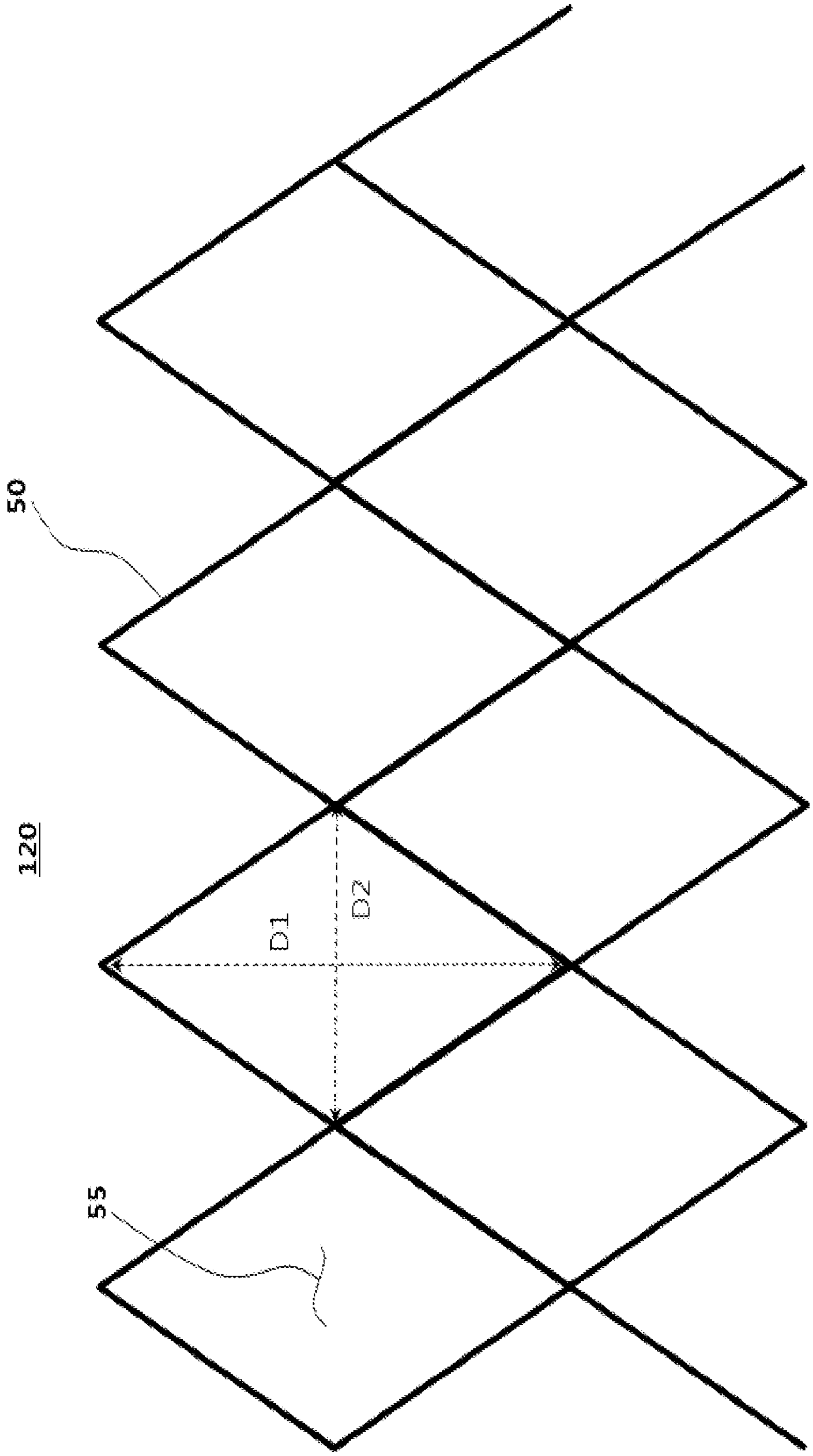
FIG. 3 is a schematic top planar view illustrating a mesh structure included in a radiator of an antenna device in accordance with exemplary embodiments.

FIG. 3 is a schematic top planar view illustrating a mesh structure included in a radiator of an antenna device in accordance with exemplary embodiments.

Referring to FIG. 3, the first mesh structure included in the radiator 122 or the first electrode layer 120 may be defined by first electrode lines 50 that cross each other.

The first mesh structure may include a first unit cell 55 defined by the first electrode lines 50 crossing each other in a substantially honeycomb shape, and a plurality of the first unit cells 55 may be gathered to define the first mesh structure.

In exemplary embodiments, the first unit cell 55 may have a substantially rhombus shape. In this case, lengths of two diagonal lines of the first unit cell 55 may be each represented by D1 and D2. In some embodiments, the length D1 of a long diagonal line may be from about 50 μm to about 400 μm, and the length D2 of a short diagonal line may be from about 20 μm to about 200 μm.

Figure 4:
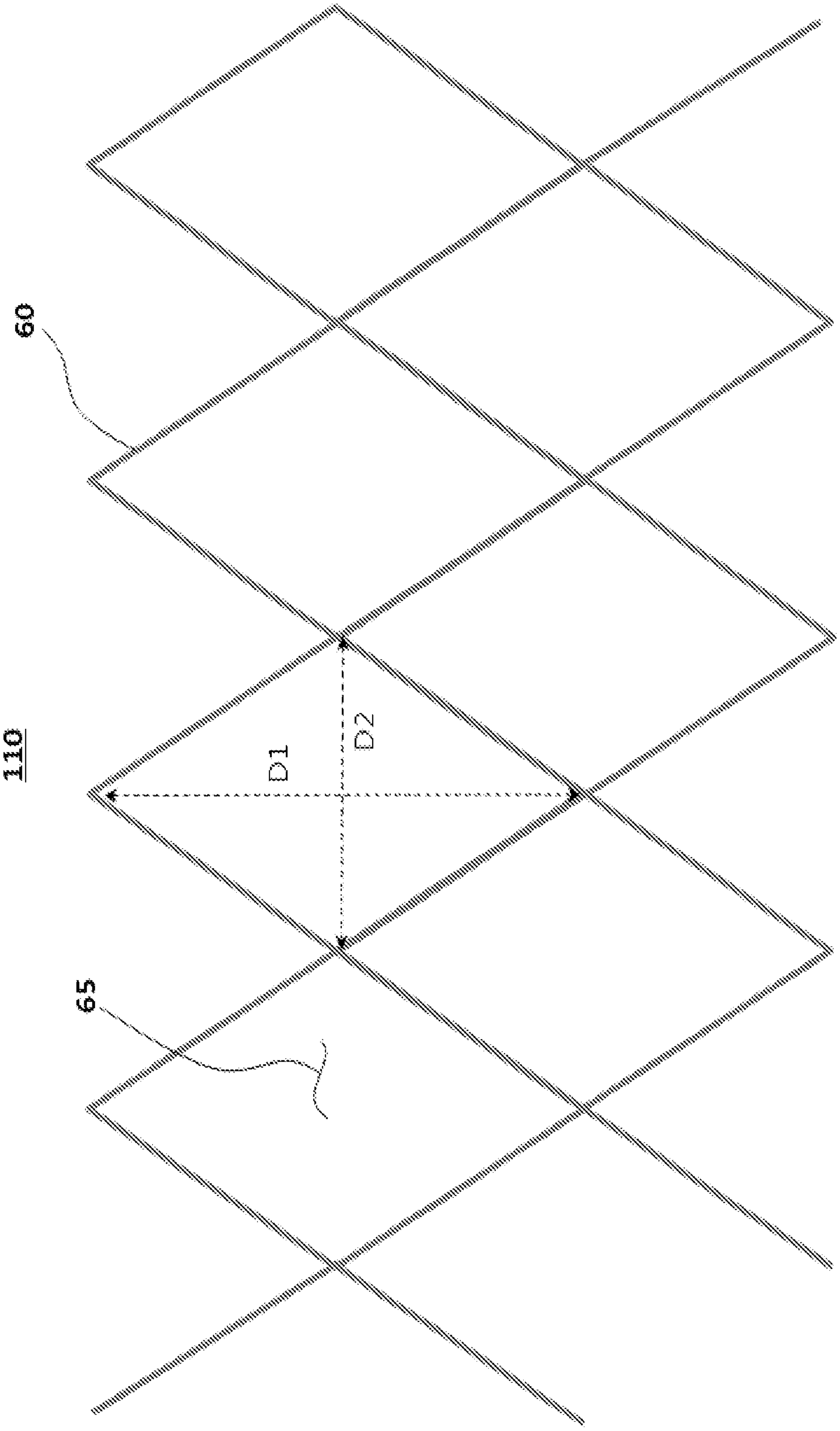
FIG. 4 is a schematic top planar view illustrating a mesh structure included in a second electrode layer of an antenna device in accordance with exemplary embodiments.

FIG. 4 is a schematic top planar view illustrating a mesh structure included in a second electrode layer of an antenna device in accordance with exemplary embodiments.

Referring to FIG. 4, as described above, the second electrode layer 110 may have the second mesh structure, and the second mesh structure may have substantially the same shape as that of the first mesh structure included in the first electrode layer 120. The second mesh structure may be defined by second electrode lines 60 that cross each other.

The second mesh structure may include a second unit cell 65 defined by the second electrode lines 60 crossing each other in a substantially honeycomb shape, and a plurality of the second unit cells 65 may be gathered to define the second mesh structure of the second electrode layer 110.

The second unit cell 65 may also have a substantially rhombus shape, and may have a length D1 of a long diagonal line and a length D2 of a short diagonal line which are substantially the same as those in the first unit cell 55.

Figure 5:
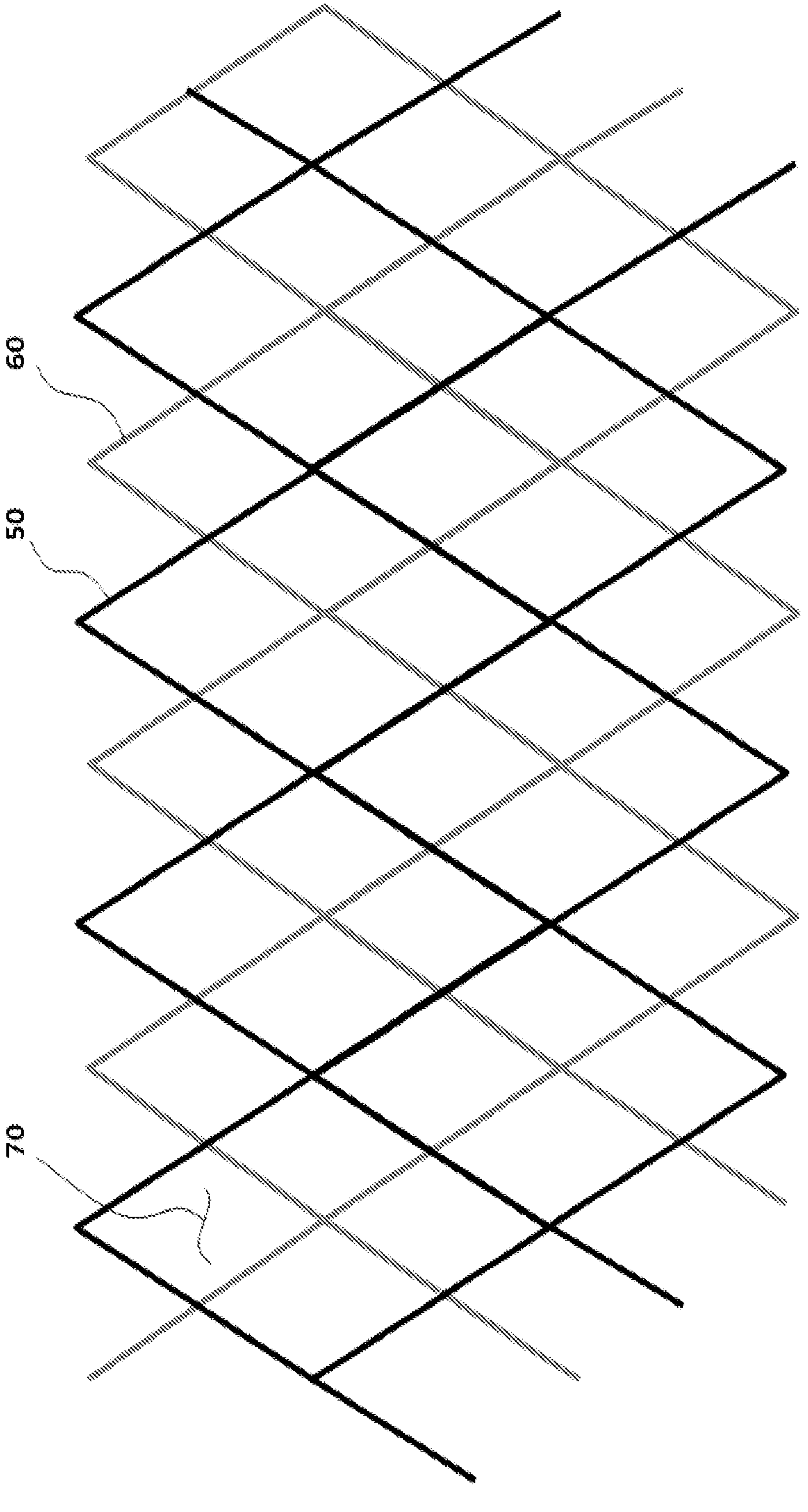
FIG. 5 is a schematic top planar view illustrating a radiator and a second electrode layer projected in a common plane in accordance with exemplary embodiments.

FIG. 5 is a schematic top planar view illustrating a radiator and a second electrode layer projected in a common plane in accordance with exemplary embodiments.

Referring to FIG. 5, the first mesh structure included in the first electrode layer 120 and the second mesh structure included in the second electrode layer 110 may face each other with respect to the dielectric layer 100 in a staggered arrangement.

In exemplary embodiments, the second mesh structure of the second electrode layer 110 may be projected to the first mesh structure of the first electrode layer 120 in a planar view so that the first unit cell 55 of the first electrode layer 120 as illustrated in FIG. 3 may be divided into sub-cells 70. The sub-cell 70 may be also defined when the second unit cell 65 of the second electrode layer 110 of FIG. 4 is projected to the mesh structure of the first electrode layer 120.

In some embodiments, the first unit cell 55 or the second unit cell 65 may be uniformly divided into the sub-cells 70 by the projection or overlap of the first and second electrode layers 120 and 110 as described above. For example, the first unit cells 55 or the second unit cells 65 having the rhombus shape may each be substantially divided into four parts to form four sub-cells 70.

A length of a long diagonal line and a length of a short diagonal line in the sub-cell 70 may each be half the length D1 of the long diagonal line and half the length D2 of the short diagonal line in the unit cells 55 and 65 as described in FIGS. 2 and 3.

In some embodiments, the length of the long diagonal line of the sub-cell 70 may be from about 25 μm to about 200 μm, and the length D2 of the short diagonal line may be from about 10 μm to about 100 μm In exemplary embodiments, the first electrode layer 120 and the second electrode layer 110 may overlap or may be projected on each other in a planar view to be observed as a substantially single mesh structure including a plurality of the sub-cells 70 repeated therein. Thus, a size of the unit cells 55 and 65 of the first electrode layer 120 and the second electrode layer 110 may be predetermined in consideration of a size of the sub-cell 70 capable of preventing electrode visibility and improving transmittance.

Subsequently, the first electrode layer 120 and the second electrode layer 110 may be intentionally mis-aligned such that the unit cells 55 and 65 may be substantially evenly divided into the sub-cells 70 having the desirable size.

According to exemplary embodiments as described above, the first electrode layer 120 including the radiator 122 and the second electrode layer 110 serving as the ground electrode may be formed to include a mesh structure having the same line width and pitch. Accordingly, the electrode patterns included in the antenna device may be prevented from being recognized by a user through enhancing pattern uniformity while improving transmittance of the antenna device.

Further, the mesh structures included in the first and second electrode layers 110 and 120 may be intentionally aligned to be offset from each other to achieve the sub-cells 70 which may have a size capable of preventing the electrode recognition and improving the transmittance. Thus, a reduction of the transmittance and an increase of the electrode recognition occurring when upper and lower mesh structures may overlap each other in a thickness direction or when the upper and lower mesh structures may be finely mis-aligned to increase an area of conductive layer may be prevented.

Figure 6:
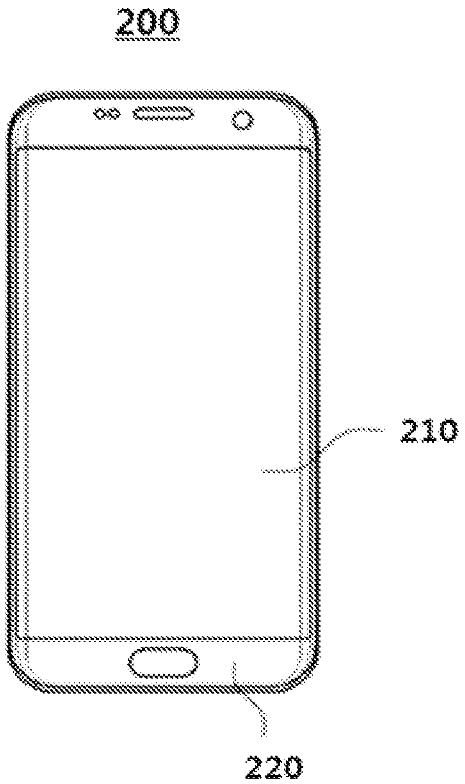
FIG. 6 is a schematic top planar view illustrating a display device in accordance with exemplary embodiments.

FIG. 6 is a schematic top planar view illustrating a display device in accordance with exemplary embodiments. For example, FIG. 6 illustrates an outer shape including a window of a display device.

Referring to FIG. 6, a display device 200 may include a display region 210 and a peripheral region 220. The peripheral region 220 may be positioned, e.g., at both lateral portions and/or both end portions.

In some embodiments, the above-described antenna device may be inserted at the peripheral region 220 of the display device as a patch or film shape. In some embodiments, the radiator 122 of the above-described antenna device may be disposed to at least partially correspond to the display region 210 of the display device 200, and the pad electrode 125 may be disposed to correspond to the peripheral region 220 of the display device 200.

The peripheral region 220 may correspond to, e.g., a light-shielding portion or a bezel portion of the display device 200. Additionally, a driving circuit such as an IC chip of the display device 200 and/or the antenna device may be disposed in the peripheral region 220.

The pad electrode 125 of the antenna device may be disposed to be adjacent to the driving circuit so that a length of a signaling path may be decreased to suppress a signal loss.

In some embodiments, the dummy electrode 126 of the antenna device may be disposed in the display region 210. Further, the second electrode layer 110 of the antenna device may also be disposed in the display region 210.

The radiator 122, the dummy electrode 126 and the second electrode layer 110 which may include a mesh structure of the same construction may be arranged such that unit cells may be projected or may cross to be offset or staggered from each other. Thus, transmittance may be improved while preventing electrode recognition.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Example 1

A first electrode layer and a second electrode layer having a mesh structure on an upper surface and a lower surface of a glass dielectric layer (0.7 T) using an alloy (APC) of silver (Ag), palladium (Pd) and copper (Cu). An electrode line width was 3 μm and an electrode thickness (or a height) was 2000 Å in the mesh structure. A length of an X-direction diagonal line (a short diagonal line) was 200 μm and a length of a Y-direction diagonal line (a long diagonal line) was 400 μm in a rhombus unit cell included in the first and second electrode layers. As illustrated in FIG. 5, the first electrode layer and the second electrode layer was aligned such that each unit cell was divided into four uniform sub-cells.

Example 2

An antenna device was prepared by the same method as that of Example 1 except that a length of an X-direction diagonal line (a short diagonal line) was 300 μm and a length of a Y-direction diagonal line (a long diagonal line) was 600 μm in a rhombus unit cell included in the first and second electrode layers.

Comparative Example

A length of an X-direction diagonal line (a short diagonal line) was 100 μm and a length of a Y-direction diagonal line (a long diagonal line) was 200 μm in a rhombus unit cell included in the first and second electrode layers. The first electrode layer and the second electrode layer were aligned such that unit cells were substantially superimposed in a planar view.

Experimental Example (1) Evaluation of Antenna Driving Properties

A feeding was performed to the antenna devices of Examples and Comparative Example so that the first electrode layer served as a radiator and the second electrode layer served as a ground electrode. Parameters relating to antenna properties (S11, Re(Z), Im(Z), Gain, Directivity, Radiation efficiency) were measured using Vector Network Analyzer (MS4644B manufactured by Anritsu) and a radiation chamber. The results are shown in Table 1 below (※ Radiation efficiency (%)=(Gain/Directivity)*100).

TABLE 1

| | Resonance Frequency (GHz) | S11 (dB) | Re (Z) | Im (Z) | Gain (dBi) | Directivity (dBi) | Radiation Efficiency (%) |
|---|---|---|---|---|---|---|---|
| Example 1 | 26.97 | −7.4 | 25.40 | 22.89 | 5.79 | 7.64 | 75.78 |
| Example 2 | 26.65 | −6.35 | 21.79 | 22.72 | 5.76 | 7.33 | 78.58 |
| Comparative Example | 26.97 | −6.43 | 24.94 | 28.98 | 5.61 | 7.53 | 74.51 |

Referring to Table 1, when the mesh structures were staggered as in Examples, the antenna properties were substantially maintained without excessive change or degradation.

(2) Evaluation of Transmittance and Electrode Visibility

1) Measurement of Transmittance

Transmittances of the antenna devices prepared by Examples and Comparative Example were measured using a spectrum colorimeter (CM-3600A, Konica Minolta) at a wavelength of 550 nm.

2) Evaluation of Visibility

The antenna devices prepared by Examples and Comparative Example were observed through naked eyes to determine whether the electrode lines or the mesh structures were visually recognized. Specifically, the antenna devices were observed by 10 panels, and the visibility was evaluated by the number of the panels who determined that the electrode patterns were clearly recognized.

◎: 0 of 10 panels

○: 1-3 of 10 panels

Δ: 4-5 of 10 panels

X: 6 or more of 10 panels.

The results are shown in Table 1 below.

TABLE 2

| | Transmittance | Electrode Visibility |
|---|---|---|
| Example 1 | 92.5% | ◎ |
| Example 2 | 94.4% | Δ |
| Comparative Example | 90.7% | ◎ |

Referring to Table 2, when the upper and lower mesh structures were aligned to be offset or staggered from each other, the transmittance was enhanced while effectively suppressing the electrode visibility. As a size of the unit cell was increased as in Example 2, the electrode recognition was slightly increased.

What is claimed is:

1. An antenna device, comprising:

a dielectric layer;

a first electrode layer disposed on an upper surface of the dielectric layer, the first electrode layer including a radiator and having a first mesh structure; and a second electrode layer disposed on a lower surface of the dielectric layer, the second electrode layer having a second mesh structure, wherein the first mesh structure includes first electrode lines which cross each other to define first unit cells, and the second mesh structure includes second electrode lines which cross each other to define second unit cells, wherein the first mesh structure and the second mesh structure are aligned to be offset or staggered from each other with respect to the dielectric layer in a planar view.

2. The antenna device according to claim 1, wherein the first unit cells and the second unit cells are projected in the planar view to be offset or staggered from each other such that sub-cells each of which is smaller than each of the first and second unit cells are formed.

3. The antenna device according to claim 2, wherein the first unit cells and the second unit cells are each uniformly divided into a plurality of the sub-cells.

4. The antenna device according to claim 2, wherein each of the first unit cells, the second unit cells and the sub-cells has a rhombus shape.

5. The antenna device according to claim 4, wherein the first unit cells and the second unit cells are each divided into 4 sub-cells.

6. The antenna device according to claim 1, wherein the second electrode layer serves as a ground electrode of the radiator.

7. The antenna device according to claim 6, wherein the first electrode layer further includes a dummy electrode around the radiator, and the dummy electrode is separated from the radiator.

8. The antenna device according to claim 7, wherein the dummy electrode includes the first mesh structure.

9. The antenna device according to claim 8, wherein the radiator and the dummy electrode are entirely superimposed over the second electrode layer in a thickness direction.

10. The antenna device according to claim 1, wherein the second electrode layer includes a lower radiator and a lower dummy electrode formed from the second mesh structure.

11. The antenna device according to claim 1, further comprising:

a transmission line electrically connected to the radiator on the upper surface of the dielectric layer; and a signal pad connected to an end of the transmission line.

12. The antenna device according to claim 11, wherein the signal pad has a solid structure.

13. The antenna device according to claim 11, further comprising a ground pad on the upper surface of the dielectric layer, wherein the ground pad is disposed around the signal pad to be separated from the signal pad.

14. The antenna device according to claim 1, wherein the first electrode layer and the second electrode layer include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca) or an alloy thereof.

15. A display device comprising the antenna device according to claim 1.

* * * * *